April 29, 1958 G. MUFFLY 2,832,839

MAGNETIC RECORDING

Filed June 19, 1952 2 Sheets-Sheet 1

INVENTOR.
GARY MUFFLY

BY [signature]

HIS ATTORNEY

SIGNALING MEANS FOR TELECOMMUNICATION SYSTEMS

Filed March 31, 1953 2 Sheets-Sheet 2

INVENTORS: ROY W. JONES
WILLIAM W. PHARIS
BY
T. L. Bowes
ATTORNEY

United States Patent Office 2,832,839

Patented Apr. 29, 1958

2,832,839

MAGNETIC RECORDING

Gary Muffly, Oakmont, Pa., assignor to Gulf Research & Development Company, Pittsburgh, Pa., a corporation of Delaware Application June 19, 1952, Serial No. 294,511

2 Claims. (Cl. 179—100.2)

This invention relates to improvements in magnetic recording and reproducing devices.

An object of the invention is to provide apparatus for magnetic recording and reproducing devices whereby it is posible to record any desired fixed, such as direct current, or variable, such as alternating current, data or the like, and to reproduce that data with minimum distortion of form and other characteristics, substantially at any rate of tape motion, including zero tape motion.

Another object of the invention is to provide apparatus for magnetic recording and reproducing devices whereby the recording and/or reproducing head and/or its magnetic circuits, are disposable at any selected variable angularity with respect to the magnetic tape axis of motion, whereby there is provided a compromise between longitudinal and transverse magnetization in which the advantages of each system are largely retained.

A further object of the invention is to provide apparatus for magnetic recording and reproducing devices, in which the magnetic recording and reproducing head is so constructed that the magnetic air gap between the poles of the head is oriented so as to produce and respond to flux at an angle with the longitudinal axis of the magnetic tape rather than parallel to the tape as heretofore commonly used in sound recording applications.

Still another object of the invention is to provide novel and improved apparatus for magnetic recording and reproduction, in which, if the head is at any selected point on the tape, it is possible to read or record, or reproduce, the value of the data for that point, whether the tape is standing still or is moving at a reasonable rate of speed in either direction, and with little if any distortion, for all purposes, in the form of the data involved.

Still a further object of the invention is to provide a novel and improved apparatus for magnetic recording and reproduction, wherein the low-frequency response is improved greatly, while maintaining substantially normal high-frequency response.

Another object of the invention is to provide novel and improved apparatus for magnetic recording and reproduction of the various forms of data mentioned herein, and with the effectiveness specified, the apparatus itself being quite simple in design and construction, relatively inexpensive to manufacture and to maintain, and which is capable of being operated with high efficiency by relatively unskilled personnel.

These and other objects and advantages of the invention will become apparent from the following description of a preferred embodiment thereof, as illustrated in the accompanying drawings, forming a part hereof, and in which:

Figure 9 is a schematic diagram of the circuit employed with the head of Figure 6, connected for magnetizing the tape;

Figure 10 is a schematic diagram of the circuit employed with the head, connected to reproduce signals and data from the tape;

Figure 11 is a curve showing one type of information which may be desired to be stored on a tape;

Figure 12 is a curve showing results obtained for the head of Figures 6 and 7, the full line being obtained when the air gap of the head is parallel to the longitudinal axis of the tape, and the broken line being obtained when the air gap makes an acute angle with the longitudinal axis of the tape;

Figure 13 is a curve for the same head showing results obtained when the air gap and the axis of the tape make an angle of 45 degrees;

Figure 14 is a curve for the same head showing results obtained when the air gap and the axis of the tape make an angle of 68 degrees;

Figures 8, 16:
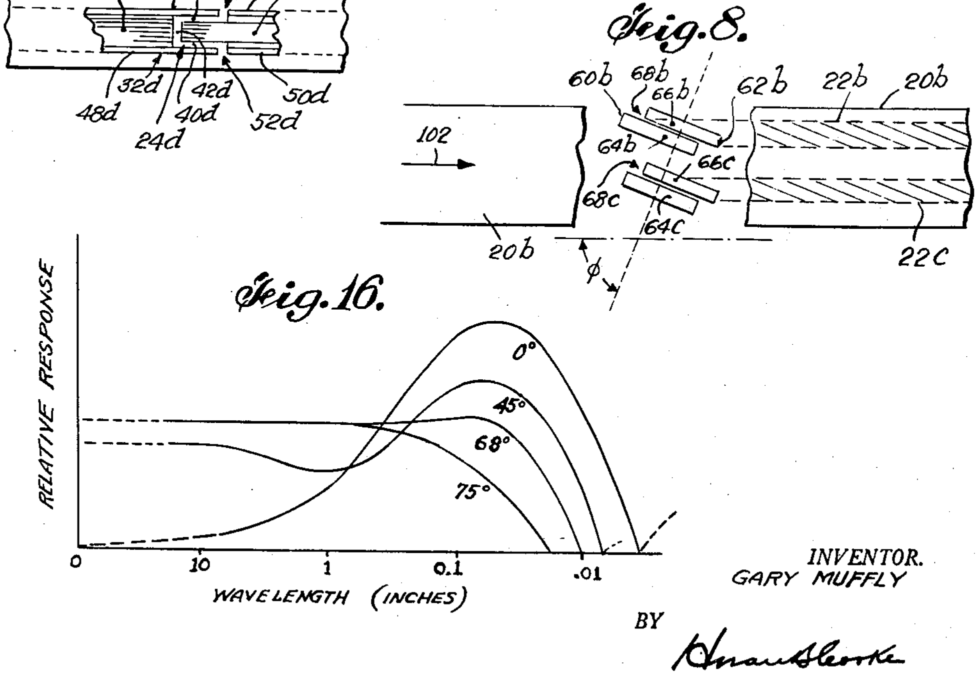
Figure 8 is a top plan view showing two pairs of angularly-disposed pole pieces of the type shown in Figures 6 and 7, and the magnetizable tape movable across the pole pieces, the tape being broken out to show the pole pieces thereunder, and indicating in cross-hatched lines, magnetized portions of the tape track.
Figure 3:
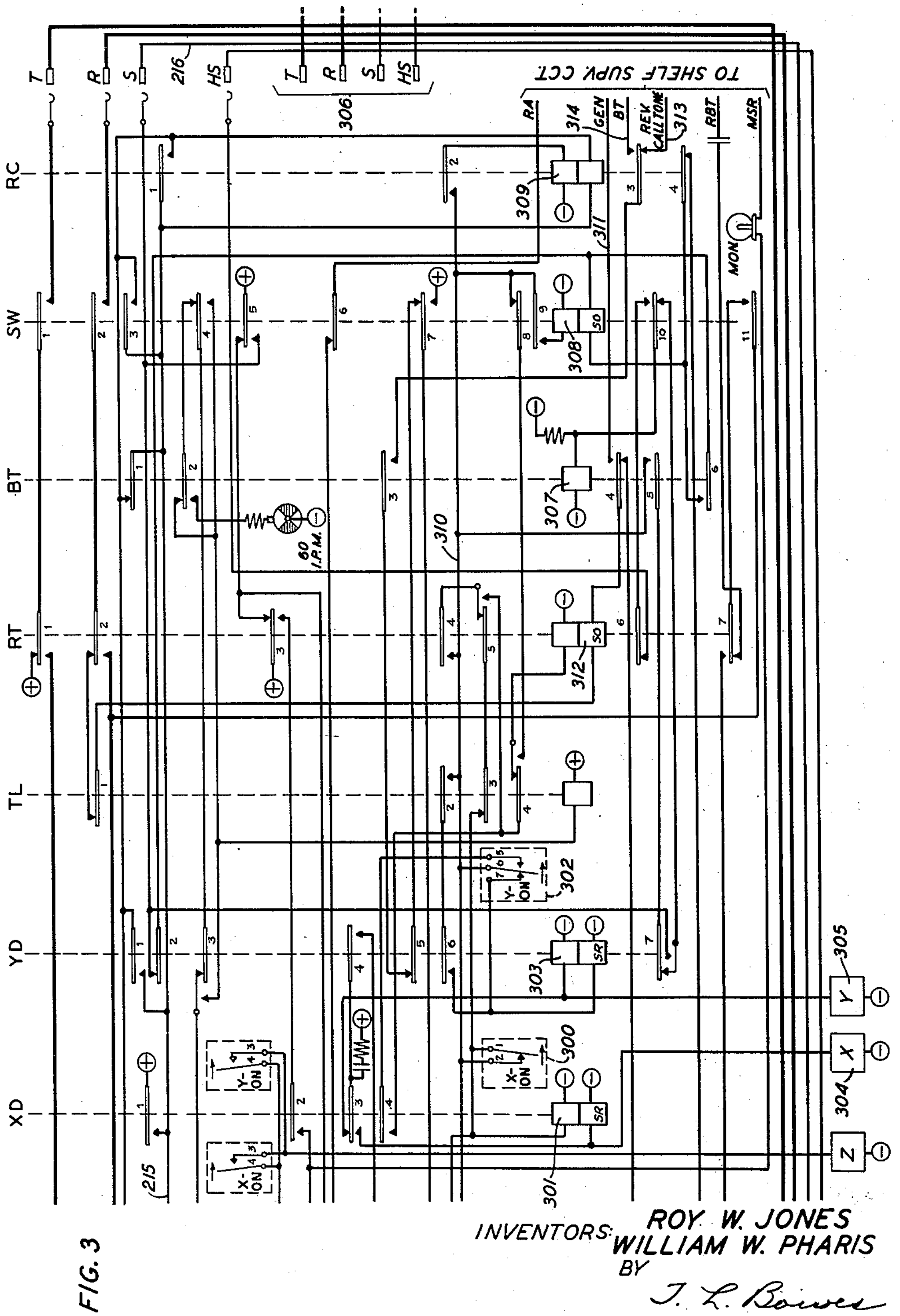

Figure 15 is a curve for the same head showing results obtained when the air gap and the axis of the tape make an angle of 75 degrees; and Figure 16 is a graphical representation showing a family of curves showing how the curves of Figures 11 to 15 are related to frequency-response characteristics, Figure 16 being actually wavelength-response curves rather than frequency-response curves where no definite tape velocity has been assigned.

In many ordinary magnetic reproducing heads, the output voltage of the head is zero when the tape is standing still, and may be proportional to the speed when the tape is moving. Thus, a tape or wire containing permanently-magnetizable material is passed over a magnetic head having a gap or aperture in contact with or in close proximity to the record medium. A coil of wire around this core has a voltage induced in it proportional to the rate of change of the flux in the core. Usually a magnetic recorder is required that will handle a range of frequencies, but difficulty is generally encountered if the frequencies are above or below certain limits.

At high frequencies a limit is reached where the output drops to zero when the recorded wavelength is equal to the effective gap length of the head. This effect is minimized by making the effective gap or aperture as small as possible in the direction of motion of the record, and by increasing the speed of the record until the recorded wavelengths are greater than the gap length. At low frequencies there are several difficulties. In the first place, the induced voltage depends upon the rate of change of flux, so that the output voltage for a given maximum flux is proportional to the frequency.

In addition to this effect, as the frequency is lowered, the recorded wavelengths become longer and longer. When the wavelengths become long compared to the size of the head, only a small part of the record flux threads the core of the head. Much of the flux passes through the air and never reaches the head. The head sees and responds only to the magnetomotive force across the part of the recorded wavelength which its effective gap spans. The total flux which the record can contain is thus fixed by the cross section and type of magnetic material in the record medium, and the magnetic elements or wavelengths are spread out so far at low frequencies that relatively few flux lines can emerge from the record per unit of length. Thus, the head can trap only a few lines, and this, combined with the low rate of change at low frequency, produces a drastic loss of the low frequencies. When direct current is recorded or the tape motion is stopped, the output becomes zero, even though some flux still passes through the head.

By means of the present invention, the low-frequency response of the head is improved greatly, while maintaining normal or near-normal high-frequency response. In addition, output is maintained even when direct current is recorded, and even when the movement of the tape is stopped.

Existing magnetic recorders generally use longitudinal recording, because the effective gap length can be made very short in the direction of the record motion, if the flux is applied lengthwise of the tape. This gives best high-frequency response. Transverse magnetization is much better at low frequencies because the flux under the gap cannot travel great distances crosswise of the record and then leak back through the air. It must return mostly through the head. However, transverse magnetization is of little, if any, value for high frequencies, because if a reasonable amount of record material is magnetized, the aperture is large in the direction of tape travel compared to the required wavelengths, and the output is lost by cancellation of opposing fluxes.

In the present invention, the tape is magnetized both longitudinally and transversely by special head arrangements. By means of improved type of head construction, there are introduced the transversely-magnetized components that are useful for direct current and extreme low-frequency work, while maintaining longitudinal components with short effective gap lengths for higher-frequency work.

In order to understand clearly the nature of the invention, and the best means for carrying it out, reference may now be had to the drawings, in which like numerals denote similar parts throughout the several views.

Figures 1, 2, 3, 4, 5:
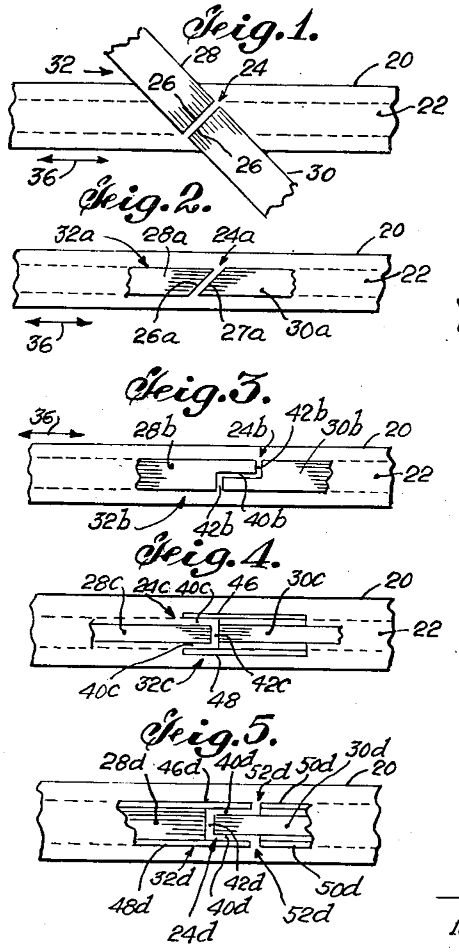
Figure 1 is a fragmentary plan view showing a magnetic head the pole pieces of which are turned substantially forty-five degrees to the longitudinal axis of the tape.
Figure 2 is a fragmentary plan view showing a modified form of the device shown in Figure 1, in which the pole tips are cut at an angle, while the cores remain parallel to the tape track.
Figure 3 is a fragmentary plan view showing another modified form of the invention shown in Figure 1, in which the pole pieces are so arranged that the air gap is partly parallel to the tape track and partly perpendicular thereto.
Figure 4 is a fragmentary plan view showing still another modified form of the invention shown in Figure 1, providing for transverse and longitudinal magnetization.
Figure 5 is a fragmentary plan view showing a further modified form of the invention shown in Figure 1, providing another mode of applying transverse and longitudinal magnetization.

Referring to Figures 1 to 5, it is seen that they show improved types of recording and/or reproducing magnetic heads, in conjunction with the moving or stationary magnetic tape. In Figure 1, there is a magnetic record tape 20, which is generally ribbon-like, formed of thin sheet material such as plastic, paper, or other suitable material which itself is non-magnetic, and may be coated on at least one face thereof with magnetic or magnetizable material in finely-divided form, such as powdered iron oxide or other material. The coating thus forms a track 22 running lengthwise of the record tape, the track thus moving across or under the magnetic air gap 24 extending between the inner edges 26 of the magnetic pole pieces 28 and 30 of the transducer head generally indicated at 32.

Figure 1 shows how the usual type of head may be turned at an angle of roughly 45 degrees to the tape 20, that is to say, the air gap 24 will form an angle of 45 degrees with the axis of the tape. The direction of the air gap is herein defined as taken parallel to the magnetic flux lines in the air gap between the pole pieces. By turning the air gap at an angle, there are introduced the transversely-magnetized components that are useful for direct current and extreme low-frequency work, while maintaining longitudinal components with short effective gap lengths along the tape which is advantageous for higher-frequency work.

In the form shown in Figure 1, the effective gap length in the direction of tape travel, indicated by the two-way arrows 36, is increased slightly so that there is some loss at high frequencies, but this is small compared to the gain on direct current and extremely low frequencies. This arrangement has been tried very successfully. It has been found that square waves of any desired length, such as indicated in Figure 11, can be recorded with full amplitude and sharp corners. While an angle of 45 degrees has been mentioned in Figure 1, it is understood that this is illustrative only, and may be varied in the individual instance and with the individual head and information being recorded or reproduced, to give the best results under the circumstances involved. As seen in Figure 14, for example, under certain circumstances, the angle of inclination of the air gap or resultant angle of inclination, may be on the order of 68 degrees, as explained hereinbelow. In any event, by use of the apparatus shown, waves which are square waves, and are several feet long, have been reproduced.

Figure 2 shows a variation of the arrangement of Figure 1, differing only in that the pole tips or edges **26*a* and 27*a* have been cut at an angle, so that the air gap 24*a* remains at an angle to the direction of travel of the tape 20, while the magnetic core or pole pieces 28*a* and 30*a* can be parallel to the record track 22**.

Figures 3, 4, and 5 show modifications, in which separate portions of the air gaps **24*b*, 24*c*, and 24*d* are arranged in relation to their magnetic pole pieces, to provide transverse and longitudinal magnetizations, respectively. Thus, in the form shown in Figure 3, the inner edges of the pole pieces 28*b* and 30*b* are cut somewhat L-shaped, the air gap being bent in effect, to provide for transverse magnetization at 40*b*, and longitudinal magnetization in the two gap sections 42*b***.

In the form shown in Figure 4, the pole pieces **28*c* and 30*c* have their abutting edges parallel to form the gap portion 42*c* for longitudinal magnetization, while the pieces 30*c* has magnetic extensions 46 and 48 to form gaps 40*c*, for transverse magnetization at the same time. In Figure 5, the pole pieces 28*d* and 30*d* have their abutting edges parallel to form the gap portion 42*d* for longitudinal magnetization, and pole piece 28*d* has magnetic extension pieces 46*d* and 48*d* to form gap portions 40*d* for transverse magnetization. At the same time it is seen that the pole piece 30*d* has magnetic extensions 50*d*, the lefthand edges of which abut near the righthand edges of the extension pieces 46*d* and 48*d* to form gap portions 52*d*** for longitudinal magnetization.

Figures 6, 7:
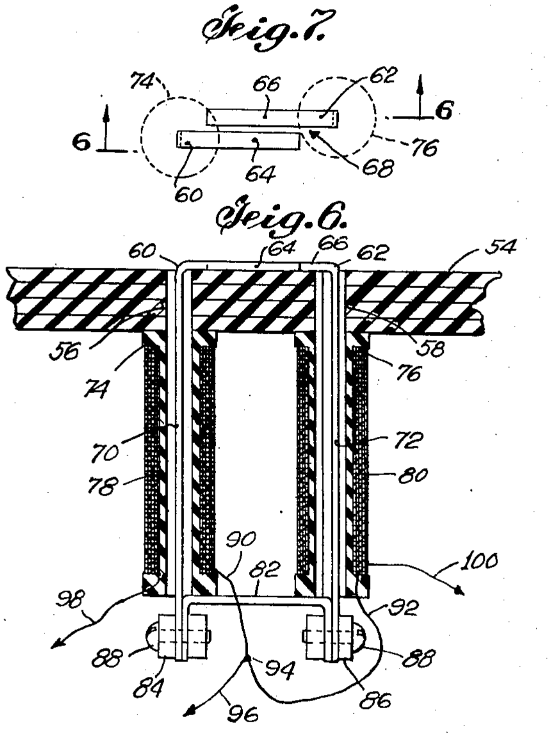
Figure 6 is a sectional elevational view taken substantially on irregular plane 6—6 of Figure 7, and showing another modified form of recording and reproducing head employed in the device according to the invention.
Figure 7 is a top plan view of the device shown in Figure 6, the view showing only the pole pieces in full lines, and indicating in broken lines other portions of the device such as the magnetizing coils, and omitting, for clarity, the upper insulating frame portion of the device shown in Figure 6.

Referring now to Figures 6 and 7, there is illustrated therein a somewhat more detailed construction of transducer or magnetic recording head according to the invention. Thus, there is an insulating main plate 54, of any suitable insulating material, such as Bakelite, Micarta, hard rubber, or ceramic materials, having openings 56 and 58 formed therethrough, with metallic cores 60 and 62 in the shape of L-shaped strips of metal of high magnetic permeability, such as "mu-metal," according to a preferred form of the invention, although other commonly-used metals for pole pieces, or even iron, may be used, with lesser results, however. Where "mu-metal" cores are used, the strips 60 and 62 may be formed with a thickness as little as 0.014 inch and a width of as little as 1/16 inch, the dimensions being somewhat exaggerated in Figures 6 and 7 for clarity only. As seen in the top plan view of Figure 7, which shows in full lines only the cores, the top legs 64 and 66 of the cores may form a gap 68 therebetween, which may be as little as about 0.003 inch or even less across, that is, between cores 64 and 66 as seen in Figure 7, and about 3/16 inch to about 1/4 inch wide, that is, from left to right as seen in Figure 7.

The vertical legs 70 and 72 of the cores 60 and 62, extend through the openings 56 and 58 of the insulating plate 54, as seen in Figure 6, and on each core a bobbin 74 or 76 carries a magnetizing winding 78 or 80. A U-shaped strap 82 also of "mu-metal" or the like, completes the magnetic circuit, being secured across the lower portions of the cores 70 and 72, and secured thereto by means of clamps 84 and 86, with screws 88 penetrating the clamps on either side of the mu-metal portions to hold them securely together. The windings 78 and 80 on the two bobbins have leads 90 and 92 interconnected at 94 to common lead 96, with individual lead wires 98 and 100 connected to the other sides of the two windings.

Looking at Figure 8, it is seen that this is a top plan view showing two magnetic heads of the type seen in Figures 6 and 7, looking down on the pole pieces 64*b* and 66*b* in the one head, and pole pieces 64*c* and 66*c* in the other head, forming magnetic air gaps 68*b* and 68*c* respectively. A tape 20*b* of magnetic recording material passes over the two gaps 68*b* and 68*c*, in the direction of the arrow 102, and is shown broken away over the heads so that they may be seen. Shaded areas 22*b* and 22*c* in the righthand portion of the tape 20*b* in Figure 8, represent invisible tracks that have been magnetized in passing over the heads. It will be observed that the gaps 68*b* and 68*c* are so oriented as to make an acute angle $\phi$ with respect to the tape. This angle is preferably large, but substantially less than the 90 degree angle used in transverse magnetic recording.

Referring now to Figure 10, there is illustrated in schematic form, an exciting oscillator of any well-known form, as at 106, connected by leads 108 and 110, to the primary winding of a transformer 112, the core 114 of which has wound thereon a secondary winding 116 which is center-tapped at 118. Lead wires 120 and 122 interconnect the outer secondary terminals of the transformer 116, with the outer terminals 98 and 100 of the windings 78 and 80 of the head which has been shown also in detail in Figures 6 and 7. The center tap 118 of the transformer is connected to common lead 96 of the magnetic head through one winding 124 of the transformer 126, by which coupling is effected with the other winding 128 of the transformer, and thus with the detector-amplifier 130, which in turn is connected with the indicator or output device 132, both devices 130 and 132 being of any well-known circuit for that purpose.

It is thus apparent that in Figure 10, the exciting oscillator 106 is shown connected to the terminals 98 and 100 of the magnetic head, just as it would be connected to a similar fluxgate type of magnetic detector. The windings 78 and 80 are so polarized that the oscillator excitation tends to saturate both halves of the core in the same direction at any instant as indicated by arrows 138. Thus, the excitation does not tend to send concentrated flux through magnetic air gap 68, but creates instead only a moderate leakage flux which returns mostly through air to the opposite ends of the cores without demagnetizing the magnetic tape. If a magnetized portion of tape is at gap 68, it sends a flux around the core, and it can readily be seen that if such flux is bucking arrow 138 on one side of the core, it is in aiding relationship to the other arrow 138. Thus the usual flux relationship of a fluxgate device is met.

The same head may be used to magnetize the tape if reconnected as shown in Figure 9. Here the signal from source 140 is combined through leads 142 and 144, through coupling transformer 146, with the usual bias or recording bias frequency from bias-frequency source 148, connected by leads 150 and 152. Devices 140 and 148 may employ any well-known suitable circuits for their purposes. In the arrangement shown in Figure 9, it is apparent that the signal is combined with the recording bias frequency from the source 148, and is injected at terminal 96 so that it divides and passes equally through the two windings 78 and 80 in opposite directions. Arrows 154 and 156 show the relative directions of the magnetizing effects of the two coils at any instant. It can be seen that they add up and tend to concentrate the magnetomotive force at the magnetic air gap 68.

An important objective of the present invention, as mentioned above, is to be able to record any desired continuous (direct current) or variable (alternating-current) data for computing devices or the like, and to reproduce that data with minimum distortion of form at any rate of tape motion, including zero motion. In other words, if the head is at a given point on the tape, we wish to read the value at that point, whether the tape is standing still or moving at a reasonable rate in either direction.

In ordinary magnetic reproducing heads, the output voltage of the head is zero when the tape is standing still, and is proportional to speed when the tape is moving. Use of a fluxgate head avoids this difficulty, but this does not afford a complete solution. Reference may now be had to Figures 11 to 15 inclusive. Thus, Figure 11 shows at 160, one type of information which might be desirable to store on a magnetic tape, but which is normally difficult to reproduce. Even with a fluxgate head of the type shown in Figure 6, with the gap 68 parallel (zero angle) to the axis of the tape, it was found that a rectangular pulse 160 (Figure 11) of about two inches in length along the tape, is reproduced with the distortion shown in curve 162 in full lines in Figure 12. The response is confined to the ends of the magnetized portion of tape. At each end, as is evident, there are obtained both plus and minus swings, instead of a single unidirectional shift, as at 164 and 166.

This can be explained as follows. The magnetized portion of the tape is simply a very long, slender, permanent magnet. The flux is remarkably uniform throughout the length of this magnet and tends to leave the magnet only in concentrated tufts at each end of the magnet. When this tuft is on one pole piece of the head, it tends to send flux through the head in one direction; and when on the other pole piece, it tends to send the flux in the opposite direction. At the middle of this recorded length of magnet, the tufts are too far from the poles of the core to have appreciable effect. This tufting effect is familiar to anyone who has experimented with a long bar magnet and has learned that the magnet will only pick up pieces of iron at or very near its ends. At its center, the magnetic flux is great, but the flux refuses to be diverted into relatively short external magnetic objects because of the lack of magnetomotive force at this point.

If, as seen in Figure 8, the recorder head is now turned at an angle $\phi$ different from zero, the tape is magnetized partly longitudinally and partly transversely. The transverse magnetization is limited to the width of the track and will send its flux through the head no matter how long a portion of the tape is magnetized. In Figure 12, the curve 168 for an angle $\phi$ of 33 degrees is shown in broken lines, the full-line curve 162 being for an angle $\phi$ of zero degrees. The rest of the curve 168 is similar to the zero degree curve 162, but some "direct-current" response is now attained.

As the angle is increased to 45 degrees, as shown in Figure 13, the objectionable kicks at 164 and 166 of Figure 12 decrease in amplitude as seen at **164*b* and 166*b* in Figure 13, and the wanted "direct-current" level 170 rises toward a limiting maximum value as shown in Figures 13 and 14. At 45 degrees, for example, as in Figure 13, the kicks 164*b* and 166*b* are perhaps only one-third their original strength. At 68 degrees, as seen in Figure 14, the curve 172 is at or near its best, very closely approximating the square wave shown in Figure 11. At 75 degrees and more, as seen in Figure 15, at 174**, the curve falls from the quality shown in Figure 14, the corners may become rounded and the slope at the ends less than desired. From this point on, as the angle $\phi$ is further increased, there is a rapid loss in the ability of the head to resolve short elements, since as previously stated purely transverse (90°) magnetic recording is of little value for recording high frequencies.

From the foregoing considerations, it is evident that there is a relationship between the quality with which the square wave of Figure 11 is reproduced as illustrated by Figures 12 to 15 and the angular setting $\phi$ (Figure 8) of the recording-reproducing head. Another interpretation of this phenomena is that the angle $\phi$ affects the overall frequency characteristic of the system. Thus there is a relationship between the curves of Figures 11 to 15, and the theory of response of systems such as are amplifiers to square wave inputs. It is well known that a certain type of response to a square wave in any kind of a system corresponds to a particular frequency-response characteristic. For example, the curve for the zero degree condition, that is curve 162 in Figure 12, indicates that the D.-C. response is nil, that the high-frequency response is good because of the very steep portions of the curve, and that there is a broad resonant peak in the curve at a frequency corresponding to the rate of the prominent oscillatory fluctuations. As the angle $\phi$ of the head is increased, the D.-C. response is seen to increase while the high-frequency response decreases somewhat and the resonant or oscillatory effect decreases and practically disappears.

Figure 16 shows how the curves of Figures 11 to 15 are related to frequency-response characteristics. However, since no definite tape velocity has been assigned, it must be kept in mind that the abscissae in Figures 11 to 15 represent distances rather than times, and so that Figure 16 is a wavelength-response curve rather than a frequency-response curve. Of course, if the recorder head is used at some fixed tape velocity, the curves of Figure 16 become frequency-response curves without change of form. For any abscissa value, the chosen velocity may then be divided by the given wavelength to determine the corresponding frequency.

Figure 16 shows that changing the angle of the head introduces D.-C. response, there being a family of curves corresponding to angles ranging from zero to seventy-five degrees, and also improves the low-frequency response, and further eliminates the peak, all at a slight sacrifice in the response at the highest frequencies. The curves of Figure 16 are qualitative and depend somewhat also on gap spacing and other structural dimensions of the recording-reproducing head.

The head angle is, of course, not the only factor entering into the response characteristics. Another important factor is the distance that a point on the tape moves across a pole piece before it reaches the gap. In the particular head illustrated, this distance is small. If this distance were larger, it would be expected that the oscillatory fluctuations at the ends of the square wave would be spread out over a greater distance, resulting in more uniform response at wavelengths approximating the dimensions of the pole pieces. For such variations, it is apparent that each core geometry would presumably require a different angle $\phi$ for optimum response. For the core arrangement disclosed herein in Figures 6 and 7, it is seen that Figure 14, that is 68 degrees, is the most favorable.

As a further refinement in the construction of the device shown in Figure 6, a strip of bronze may be disposed in the magnetic air gap 68 to maintain an accurate gap spacing, such as 0.003 inch. The term "air gap" as used herein and in the appended claims is meant to comprise the space between the pole pieces and may have the various shapes disclosed herein or their equivalent and furthermore may be wholly or partially filled with substantially nonmagnetic material such as bronze, Bakelite, etc.

Small screws may be used to hold the pole pieces down against the Bakelite plate 54 and for urging them inwardly against the gap spacer. The top surface of the plate 54 may be covered with a polymerizing cement to hold everything together, and this may be ground to an even surface flush with the top surface of the pole pieces 64 and 66. The coil spools 74 and 76 may have nipples at their upper ends which plug into the bores 56 and 58 of the plate 54. As a further refinement and preferred construction, the upper surface of plate 54 and the ground surface of the cement as mentioned, may be finished on a radius of about three inches in order to assure intimate contact between the head and the tape. A preferred form of magnetic tape may have an iron oxide coating on a 35 millimeter plastic stock, similar to motion picture film, and felt pads or soft rubber rollers may be used over each gap to further improve contact of the film on the head.

In accordance with the foregoing definition, the term "air gap" as used in the appended claims is characterized as having a direction which is taken parallel to the magnetic flux lines in the air gap between the pole pieces.

Although I have described my invention in specific terms, it will be understood that various changes may be made in size, shape, materials and arrangement without departing from the spirit and scope of the invention as claimed.

What I claim as my invention is:

1. Magnetic reproducing apparatus capable of reproducing sustained unidirectional signals and alternating signals of long and short wave lengths recorded on a movable magnetizable record medium, the amplitude of the reproduced signal being substantially independent of whether the medium is moving or at rest, which comprises a magnetic circuit having two core legs, windings comprising at least one coil on each of said core legs, said magnetic circuit containing closely-spaced parallel pole pieces forming an air gap of short length and laterally-extended width adapted for being placed near the record medium, said pole pieces being oriented to give the conterminous air gap flux a direction which makes an angle greater than forty-five degrees and less than ninety degrees with the path of the record medium, a source of alternating current connected to said windings in polarity to effect excitation of said core legs with like polarization at said pole pieces, and signal-indicating means connected to at least one winding on each core leg in polarity to indicate the difference between the voltages induced in said windings.

2. Magnetic reproducing apparatus capable of reproducing sustained unidirectional signals and alternating signals of long and short wave lengths recorded on a movable magnetizable record medium, the amplitude of the reproduced signal being substantially independent of whether the medium is moving or at rest, which comprises a magnetic circuit having two core legs, windings comprising at least one coil on each of said core legs, said magnetic circuit containing closely-spaced parallel pole pieces forming an air gap of short length and laterally-extended width adapted for being placed near the record medium, a part of the lateral extension of said pole pieces being oriented to give the conterminous air gap flux a direction which makes an angle of considerably less than ninety degrees with the path of the record medium and another part of the lateral extension of said pole pieces being oriented to give the conterminous air gap flux a direction which makes an angle of substantially ninety degrees with the path of the record medium, a source of alternating current connected to said windings in polarity to effect excitation of said core legs with like polarization at said pole pieces, and signal-indicating means connected to at least one winding on each core leg in polarity to indicate the difference between the voltages induced in said windings.

References Cited in the file of this patent

UNITED STATES PATENTS

| | | |
|---|---|---|
| 2,543,483 | Barrett | Feb. 27, 1951 |
| 2,608,621 | Peterson | Aug. 26, 1952 |
| 2,635,149 | Cain | Apr. 14, 1953 |
| 2,673,248 | Hamberg | Mar. 23, 1954 |

FOREIGN PATENTS

| | | |
|---|---|---|
| 504,932 | Great Britain | Apr. 28, 1939 |